United States Patent [19]

Hancock et al.

[11] 4,202,944
[45] May 13, 1980

[54] SELECTIVE ION EXCHANGE RESINS WITH PYRIDYL-IMIDAZOLYL CHELATING FUNCTIONAL GROUPS

[75] Inventors: Robert D. Hancock, Germiston; Roy F. Bond, Johannesburg; Brian R. Green, Weltevreden Park Extension 9, all of South Africa

[73] Assignee: National Institute for Metallurgy, Randburg, South Africa

[21] Appl. No.: 940,457

[22] Filed: Sep. 7, 1978

[30] Foreign Application Priority Data

Sep. 7, 1977 [ZA] South Africa .................. 77/5398

[51] Int. Cl.² .................. B01D 15/04; C08F 26/06
[52] U.S. Cl. .................. 521/32; 423/24; 525/375
[58] Field of Search .................. 526/17, 58; 423/24; 75/101 BE; 521/25, 32

[56] References Cited

U.S. PATENT DOCUMENTS

| | | | |
|---|---|---|---|
| 3,873,668 | 3/1975 | Melby | 423/24 |
| 3,884,846 | 5/1975 | Otsuke et al. | 526/30 |
| 4,107,098 | 8/1978 | Tomuro et al. | 521/25 |

Primary Examiner—Joseph L. Schofer
Assistant Examiner—Peter F. Kulkosky
Attorney, Agent, or Firm—Cushman, Darby & Cushman

[57] ABSTRACT

An ion exchange resin having functional groups of the formula :-

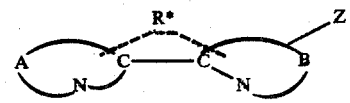

wherein :-
A and B, independently of each other, represent groups forming together with the attached carbon and nitrogen atoms, an optionally substituted five or six membered heterocyclic ring which may embody a further heteroatom and wherein at least one of such heterocyclic rings is an aromatic ring; R* may be totally absent or it may represent an optionally substituted alkyl radical and Z represents a resin to which the functional groups are attached.

7 Claims, No Drawings

SELECTIVE ION EXCHANGE RESINS WITH PYRIDYL-IMIDAZOLYL CHELATING FUNCTIONAL GROUPS

This invention relates to ion exchange resins of the type exhibiting selectivity towards certain metal ions over others which may be present in the same solution.

Some metals, such as copper and nickel, are difficult to separate from other metals, such as iron, together with which they usually occur in nature, in an economic manner.

Selective ion exchange processes have thus been developed. One of the most well known of such processes employs a liquid extractant made by General Mills Inc. and sold under their registered Trade Mark "LIX". However, solvent extraction has certain acknowledged disadvantages, such as phase separation problems, and a process based on an ion exchange resin would be preferable.

As a result of this a resin selective towards copper and nickel has recently been brought on to the market by Dow Chemicals and is sold under their trade reference "DOW 4196".

It is the object of this invention to provide an alternative to the resin mentioned above and which may be capable of being 'tailored' to provide improved properties with regard to speed of loading of the resin, or decreased rate of degradation or improved selectivity or any combination of such properties.

It is another, but ancillary object of the invention to provide an ion exchange resin which in addition to being selective on the adsorption cycle can be rendered more highly selective by selective stripping. This object includes the provision of a process involving two stage stripping of an ion exchange resin according to the invention.

In accordance with this invention there is provided an ion exchange resin having functional groups of the formula:

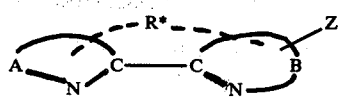

wherein:

A and B, independently of each other, represent groups forming together with the attached carbon and nitrogen atoms, an optionally substituted five or six membered heterocyclic ring which may embody a further heteroatom and wherein at least one of such heterocyclic rings is an aromatic ring; R* may be totally absent or it may represent an optionally substituted alkyl radical, and Z represents a resin to which the functional groups are attached.

Further features of the invention provide for the heterocyclic rings to be optionally substituted pyridyl, imidazolyl or imidazoline groups and for the functional groups to be selected from pyridyl-imidazolyl (formulae 1 and 2 below), and imidazoline-pyridyl formula 3 below).

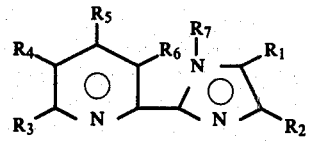

Formula 1

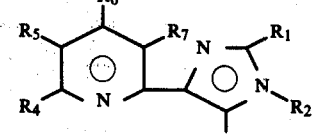

Formula 2

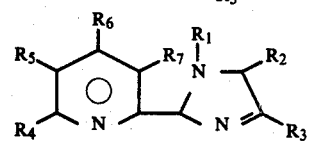

Formula 3

In the above formulae $R_1$, $R_2$, etc. each represents, independently of the others, hydrogen or a substituent which can enhance the performance of the functional group or at least will not adversely affect the ion exchange properties of the functional group.

The functional groups illustrated in the formulae shown above could be attached at any suitable position to a suitable resin matrix to provide the ion exchange resins.

In general the substituents on the two heterocyclic rings will, apart from the resin itself, have a limited number of atoms so as not to affect adversely the ion exchange properties. Thus, it is preferred that all the substituemts by hydrogen apart from one which may be hydrogen, methyl, bromo or methoxy. Preferred resins are the resin of Formula 1 wherein $R_1$, $R_3$, $R_4$, $R_5$ and $R_6$ are hydrogen, $R_2$ is hydrogen, methyl, chloro, bromo, or methoxy, and, $R_7$ represents the resin and the resin of Formula 2 wherein $R_1$ and $R_3$ are hydrogen and $R_2$ represents the resin.

The resin may be any suitable resin but is conveniently a macroporous styrene/divinyl benzene matrix whereof the porosity is varied as required by varying the amount of porogen during manufacture and the cross-linking is controlled by varying the amount of divinyl benzene in the usual way. The styrene in some cases may have bromine embodied therein by attaching it to the phenyl ring.

The preferred resins of the invention have the general formula:

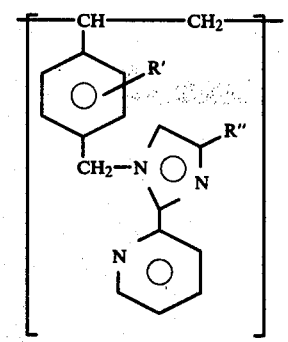

Formula 5 wherein $R^1$ is hydrogen or bromine and $R^{11}$ is hydrogen, methyl, chloro, bromo, or methoxy. In the above formula the positions of $R^{11}$ and the pyridyl group may also be reversed.

The invention also provides a method of extracting nickel or copper, or both, from aqueous solutions thereof, comprising contacting the aqueous solution with an ion exchange resin as defined above, separating the ion exchange resin from the barren aqueous solution and stripping the extracted copper and nickel from the ion exchange resin.

It is also envisaged that ion exchange resins according to this invention can be used to extract selectively certain complex ions of the platinum group metals.

Further features of this aspect of the invention provide for stripping to be effected using ammonia or acid solutions and in the case of nickel and copper, where both are present for them to be separated subsequently by precipitating copper out of ammonia solution with sulphur dioxide. In particular, the copper and nickel may be stripped with ammonia solution followed by an acid strip to remove co-extracted iron if any is present.

Other applications for the ion exchange resin of this invention may well exist and the scope hereof is not to be interpreted as being limited to the above applications.

The resins of this invention possess the advantage that changes in the groups $R_1$, $R_2$, ... $R_7$ above alters the selectivity and stability of, for example, copper and nickel complexes with the attached ligand. This allows the resins to be stripped with various strengths of acid solution or with various strengths of ammonia solution. Thus, in the separation of copper or nickel from iron, for example, the nickel or copper can be stripped from the resin by treatment with ammonia solution with negligible concomitant stripping of any iron present on the resin. Introducing a substituent e.g. $R_1$ or $R_2$ or $R_3$ ... $R_7$=—Br or —$CH_3$ enables the copper extracted by the resin, to be stripped almost quantitively with 10 percent sulphuric acid solution.

Mixtures of copper and nickel may be efficiently separated with ligands of this type wherein $R_n$=H since copper is poorly stripped by 10 percent or weaker sulphuric acid solution while nickel is very efficiently stripped from such resin at this concentration of acid. The copper may then be efficiently stripped by means of dilute ammonia solution.

A number of experiments have been carried out, the results of which are given below.

SYNTHESIS 1

A compound of the formula 1 above wherein $R_1$=...$R_7$=H was synthesized by the following method. Ice-cold solutions of pyridine-2-aldehyde (10.7 g) in ethanol (10 ml) and glyoxal (20 ml of 30% aqueous solution) in ethanol (10 ml) were mixed and then, without delay, ice-cold concentrated aqueous ammonia solution (30 ml of 20 N) was added. The yellow-brown solution was kept at 0° for 30 minutes, then allowed to stand overnight at room temperature. Most of the ethanol was distilled off and the cold residue extracted many times with ether. The solvent was removed from the combined, dried, ether extracts and the residual oil distilled in vacuo. A pale yellow oil (8 g), b.p. 130°-132° (0,5 mm) was collected. It soon solidified and was purified by re-crystallization from ethyl acetate as yellow prisms, m.p. 134°-135°.

This ligand (5 g) was reacted with a chloromethylated polystyrene matrix (3.28 g) in ethanol (10 ml) in the presence of potassium hydroxide (1.2 g) for 20h at 50° C. The resin was then washed consecutively with water, ethanol and finally acetone and dried in vacuo. The resultant resin is termed Resin 1 for the purposes of this specification.

SYNTHESIS 2

The introduction of a bromine atom into resin 1 ($R^{11}$=Br) was achieved by treating resin 1 (5 g) with bromine (3.07 g) in dichloromethane (10 ml) at 0° C. for 2 hours and then at 40° C. for 1 hour to give the high density resin (1,25 g/cc) which is termed Resin 2 hereinafter.

EXPERIMENT 1

A test was carried out in which 500 ml of the same solution was slowly passed through a bed of resin 1 (1 g) over a period of 6,1 and 8 hours respectively. The resins were separately stripped, firstly with 10% ammonia solution (25 ml) and secondly with 10% sulphuric acid solution (25 ml). The results of these tests are given in Table 1.

| | Copper and Iron loading of Pyridyl-Imidazole Resin 1 | | | |
|---|---|---|---|---|
| | Metal Stripped (m equivalent per g resin) | | | |
| LOAD TYPE | 10% $NH_4OH$ STRIP (1) | | 10% $H_2SO_4$ STRIP (2) | |
| | Cu | Fe | Cu | Fe |
| 1h LOAD | 0,48 | 0,004 | 0,01 | 0,26 |
| 8h CAPACITY LOAD | 0,95 | 0,004 | 0,01 | 0,14 |

The results show that $$\frac{(Cu^{2+})1h}{(Fe^{3+})1h} = 1,85 \text{ and } \frac{(Cu^{2+})8h}{(Fe^{3+})8h} = 6,33$$

This indicated that over a period of time, copper displaced iron from the resin. The results also reveal that very little iron is stripped with 10% ammonia solution and an effective selectivity of $$\frac{(Cu^{2+})8h}{(Fe^{3+})8h} = \frac{0,95}{0,004} \text{ (greater than 200)}$$

for the solution is obtained, resulting in an efficient $Cu^{2+}/Fe^{3+}$ separation.

EXPERIMENTS 2

Resin 1 (1 g) was contacted with 50 ml of a solution containing 1 g/l nickel for six hours. This resin was then extracted with 25 ml 10% sulphuric acid. The stripped solution contained 914 mg/l nickel showing a loading of nickel of 0,389 mmole/g of resin.

EXPERIMENT 3

Treatment of Resin 2 with a solution of 3,09 g/l $Fe^{3+}$, 1,0 g/l Cu and subsequent stripping with 25 ml 10% sulphuric acid solution led to a reduction in capacity and selectivity but allowed an almost quantitative recovery of $Cu^{2+}$.

EXPERIMENT 4

Resin 1 (0,3 g) was contacted with 25 ml of a sulphate solution containing Co (1620 ppm) and Ni (820 ppm) at pH2. The loaded resin was stripped with 25 ml of 10% sulphuric acid solution and then the resulting solution was found to contain 330 ppm nickel and only 20 ppm Co. Stripping of these metals from the resin was quantitative.

EXPERIMENT 5

Resin 1 (0,3 g) was contacted for six hours with 25 ml of various mixed solutions of Cu, Ni, Zn, Fe, Co to establish the selectivity of the resin for these metals. The results of these tests are listed in Table 2 overleaf.

It will be noted that the resin is highly selective towards copper in particular and that iron which becomes adsorbed to a small extent is very poorly stripped by $NH_4OH$ whilst it is well stripped by the 10% dilute sulphuric acid.

TABLE 2

| TEST | ANALYSIS OF BARREN SOLUTION (mg/l) | STRIP SOLUTION 25ml in each case | m EQUIV. METAL STRIPPED PER g RESIN | | | | |
|---|---|---|---|---|---|---|---|
| | | | Cu | Ni | Co | Fe | Zn |
| 1 Load solution Co, Ni (1,0 g/l each) | Ni 630 | (i)*10% ammonia (ii)10% $H_2SO_4$ | | 0,47 0,05 | 0,04 <0,01 | | |
| 2 Load solution Ni 570 mg/l Cu 1010 mg/l | Ni 450 Cu 230 | (i)10% $NH_4OH$ (ii)10% $H_2SO_4$ | 0,96 0,01 | 0,11 0,03 | | | |
| 3 Load solution Ni 990 mg/l $Fe^{3+}$ 1020 mg/l | Ni 720 Fe 840 | (i)10% $NH_4OH$ (ii)10% $H_2SO_4$ | | 0,30 0,06 | | <0,01 0,24 | |
| 4 Load solution Co, Ni, Cu, $Fe^{3+}$, (1,0 g/l each) | Ni 890 Co 930 Fe 940 Cu 330 | (i)10% $NH_4OH$ (ii)10% $H_2SO_4$ | 0,83 0,01 | 0,09 0,03 | 0,02 0,01 | <0,01 0,09 | |
| 5 Load solution Co, Ni, Cu, $Fe^{2+}$, Zn (1,0 g/l each) | Ni 920 Co 960 Fe 980 Zn 960 | (i)10% $H_2SO_4$ (ii)10% $NH_4OH$ | 0,58 0,25 | 0,11 0,01 | 0,03 <0,01 | 0,03 0,003 | 0,02 0,01 |

*NOTE:
Stripping of resins
(i) = initial strip
(ii) = subsequent strip

EXPERIMENT 6

Similar experiments were carried out in which resin 1 (0,4 g) was treated with 25 ml solutions of platinum group metals (PGM) for six hours. The resin showed (cf. Table 3) fair extraction ability for PGM and initial stripping with ammonia accomplished completed recovery of palladium and partial recovery of platinum but poor recovery of gold, ruthenium, iridium and rhodium.

TABLE 3

| Solution tested | Conc. in solution (mg/l) | | Amount of resin after stripping (m equiv/g resin) | Amount stripped * (m equiv/g resin) | |
|---|---|---|---|---|---|
| | before load | after load | | 10%$NH_4OH$ | 5M HCl |
| Pt | 2400 | 120 | 0,35 | 0,0169 | 0,18 |
| Pd | 850 | 1 | 0,01 | 0,48 | 0,01 |
| Rh | 690 | 44 | 0,38 | 0,01 | 0,01 |
| Ir | 51 | 5 | 0,03 | 0,01 | 0,01 |
| Ru | 110 | 4 | 0,06 | 0,01 | 0,01 |
| Au | 650 | 1 | 0,11 | 0,02 | 0,06 |

* Stripping of resins:
10% $NH_4OH$ = Initial strip
5M HCl = Subsequent strip

In a second series of experiments further resins were made and in this case the resins themselves were synthesized according to well known procedures: the relevant details are tabulated in Table 4 below.

The first five resins had the general configuration of Formula 5 above whilst the sixth had the configuration of Formula 5 with the pyridyl group being in the position of $R^{11}$. The active groups were made as outlined above for Synthesis 1 with the necessary alterations which will be apparent to those skilled in the art. The preparations were effected as follows:

RESIN 3

2-pyridyl-$2^1$-imidazole ($R^1$=H, $R^{11}$=H in Formula 5 above) on a styrene matrix.

A macroporous sytrene/DVB matrix as defined in Table 4 was chloromethylated by a well known procedure and the resulting resin was treated with the pyridyl-imidazole ligand as prepared in Synthesis 1) (4 molar excess) in an ethanol/water mixture containing a 1,2 molar equivalent of KOH at 40° for 6 h and at 70° C. for 16 h. The product resin was washed with ethanol and water.

RESIN 4

2-pyridyl-$2^1$-imidazole ($R^1$=Br, $R^{11}$=H in Formula 5) on a bromostyrene matrix.

A macroporous bromostyrene/DVB matrix was synthesized and chloromethylated by a well known procedure and the resin was aminated as described above in relation to Resin 3.

RESIN 5

2-pyridyl-$2^1$-imidazole ($R^1$=Br, $R^{11}$=H in Formula 5) on a brominated styrene matrix.

A macroporous styrene/DVB matrix was brominated with an equimolar amount of $Br_2$ in the presence of dichloroethane solvent and Fe catalyst (0,02 molar equivalent) at ambient temperature for 20 h. The resin was washed with methanol and dried. The brominated resin was chloromethylated and aminated by the same procedure used for Resin 3.

RESIN 6

2-pyridyl-$4^1$-bromo-$2^1$-imidazole ($R^1$=H, $R^{11}$=Br in Formula 5) on a styrene matrix.

1 g of 2-pyridyl-2¹-imidazole resin i.e. Resin 3 was treated with 0,7 ml of bromine in dichloroethane at 0° for 2 h and at 70° for 1 h. NOTE: It is also possible to brominate the ligand before aminating the chloromethylated resin.

RESIN 7

2-pyridyl-4¹-methyl-2¹-imidazole ($R^1$=H, $R^{11}$=$CH_3$ in Formula 5) on a styrene matrix.

A chloromethylated, macroporous styrene/DVB matrix was treated with a 1,5 molar equivalent of ligand in ethanol containing a 1,2 molar equivalent of KOH. The mixture was heated at 50° for 40 h to produce the final resin.

RESIN 8

2-pyridyl-4¹-imidazole resin on a styrene matrix (i.e. the pyridyl group in position $R^{11}$ of Formula 5).

A macroporous matrix was chloromethylated and aminated by a procedure similar to that described in relation to Resin 3 using the isomeric pyridyl imidazole ligand.

The following tests were conducted on Resins 3,4 and 7 and a comparison made with DOW 4196 resin mentioned above.

(a) Density, HCl capacity and water retention capacity were determined by well known methods.

(b) Total $Cu^{2+}$ and $Fe^{3+}$ capacities (pH 2) were determined by contacting the resins in a column with 20 times stoichiometric excess copper or ferric sulphate solutions (5 g/l metal) at $pH_2$ for 20-24 h. The quantity of metal loaded was determined by complete elution of the metal from the resin followed by analysis of the eluant.

(c) The preference for $Cu^{2+}$ over $Fe^{3+}$ was determined by contacting 0,5 g of resin with 500 ml of an artificial plant solution at pH 2 and containing 1 g/l $Cu^{2+}$, 3 g/l $Fe^{3+}$, 10 g/l $Mg^{2+}$ (as sulphates) and saturated with calcium sulphate. Resins were contacted with the solution for 24 hour periods. Metals were stripped for 5 h with 25 ml of 12% $H_2SO_4$, and finally by 25 ml of $NH_4OH$ (10 g/l $NH_3$) for 24 h. Separation factors αCu/Fe (a measure of the resins preference for $Cu^{2+}$ over $Fe^{3+}$) were calculated for a final solution concentration of 0,90 g/l Cu (±0,05 g/l) and 3,0 g/l Fe (±0,05 g/l).

$$\alpha Cu/Fe = \frac{\overline{(Cu)} \ \overline{(Fe)}}{(Cu) \ (Fe)}$$

where $\overline{(M)}$ indicates metal on resin and $(M)$ indicates metal in solution.

The results of these tests are summarised in Table 4 (a) and (b) overleaf.

TABLE 4a

| Resin (type) | R | Details % DVU | Porogen ml g⁻¹ of monomers | Density | WRC % | Cl⁻ Capacity (mmol g⁻¹) | Total Metals mmol g⁻¹ separately determined Cu | Fe |
|---|---|---|---|---|---|---|---|---|
| Resin 3 | H | 5,6 | 0,99 | 1,12 | 54 | 2,9 | 2,4 | 1,3 |
| Resin 4 | H | 5,6 | 1,22 | 1,08 | 59 | 3,0 | 2,6 | 1,6 |
| Resin 4 | Br | 3,4 | 0,51 | 1,20 | 49 | 2,5 | 2,1 | 0,8 |
| Resin 7 | H ($R^{11}$=$CH_3$) | 5,6 | 1,22 | — | 63 | 2,5 | 1,6 | |
| DOW 4196 | H | — | — | 1,09 | 52 | 2,9 | 2,3 | 1,7 |

Table 4b

| Resin (Type) | M in equilibrium with 0,9 g/l Cu + 3,0 g/l Fe in plant solution Cu | Fe | αCu/ Fe | Metals Stripped by 12% $H_2SO_4$ 5h Cu | Fe | 19h Cu | Fe | (% of metals on the resin) $NH_4OH$ strip Cu | Fe |
|---|---|---|---|---|---|---|---|---|---|
| Resin 3 | 1,4 | 0,2 | 27 | 65 | 100 | 19 | 0 | 15 | 0 |
| Resin 4 | 1,5 | 0,3 | 19 | 64 | 100 | 19 | 0 | 9 | 0 |
| Resin 4 | 1,1 | 0,2 | 22 | 66 | 100 | 19 | 0 | 14 | 0 |
| Resin 7 | 1,0 | 0,2 | 22 | 92 | 95 | 7,5 | 5 | 0,5 | 0 |
| DOW 4196 | 1,3 | 0,4 | 14 | 96 | 99 | 4 | 1 | — | — |

RESINS 6 & 8 were subjected to the following test.

0,5 g of resin was shaken with 25 ml of artificial plant solution as described in (i) for 6 h. The loaded resin was stripped completely and the eluant was analysed for $Cu^2$ and $Fe^{2+}$. The results are summarised in Table 5.

TABLE 5

| Resin | Copper loaded mmol/g | Iron loaded mmol/g |
|---|---|---|
| 6 | 0,4 | 0,06 |
| 8 | 0,4 | 0,10 |

RESIN 9

Synthesis of a ligand according to Formula 3 above:

Pyridyl imidazoline was synthesized as follows: Picolinic acid (12,3 g) was mixed with ethylene-diamine (6,0 g) in a round bottom flask. The mixture was heated at 150°-160° C. for 4 h. The product was then distilled at a high temperature, to afford a pale yellow liquid which crystallised on standing.

The liquid was purified in silica gel using 6% methanol/chloroform as eluant. (Found C65,20 H5,95, N28,49%; $C_8H_9N_3$ requires: C65,31, H6,12; N28,57%).

Attachment of the ligand to a chloromethylated resin (a resin manufactured by Rohm & Haas and sole under their trade reference XE 305) was unsuccessful.

The ligand was more successfully attached using NaH under anhydrous conditions. The ligand (0,5 g) in dry dimethyl formamide (3 ml) in a flamed-dry flask fitted with a $CaCl_2$ drying tube was reacted sodium hydride (0,086 g). The mixture was stirred at room temperature for 2 h, then at 60° C. for a further 1 h.

Chloromethylated XE 305 resin (0,435 g) was added and the slurry heated at 60° C. for 18 h. Water (3 ml) was added and the mixture heated at 60° C. for 2 h. The resin was washed, dried and loaded with plant solution. The selectivity coefficient for Cu over Fe was determined as α Cu/Fe=6.

Initial tests have further indicated that good rates of loading of copper are achieved and, in fact, in some cases the rates were appreciably superior to the DOW 4196 resin.

What we claim as new and desire to secure by Letters Patent is:

1. An ion exchange resin having functional groups of the formula:

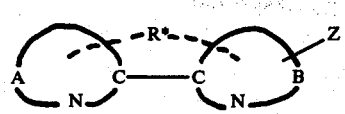

wherein:

A and B, independently of each other, represent groups forming together with the attached carbon and nitrogen atoms, an optionally substituted five or six membered heterocyclic ring independent of each other and selected from the group consisting of optionally substituted pyridyl, imidazole and imidazolyl groups; R* may be totally absent or it may represent an optionally substituted alkyl radical and Z represents a resin to which the functional groups are attached.

2. Ion exchange resins as claimed in claim 1 in which one heterocyclic ring is pyridyl and the other is imidazolyl.

3. Ion exchange resins as claimed in claim 1 in which one heterocyclic ring is pyridyl and the other is imidazoline.

4. Ion exchange resins as claimed in claim 1 in which said heterocyclic rings are substituted by at least one methyl, chloro bromo or methoxy groups.

5. Ion exchange resins as claimed in claim 1 in which the resin itself is a styrene matrix cross-linked with di-vinyl benzene.

6. Ion exchange resins as claimed in claim 5 in which the resin is a macroporous resin.

7. An ion exchange resin having repeating functional groups of the formula:

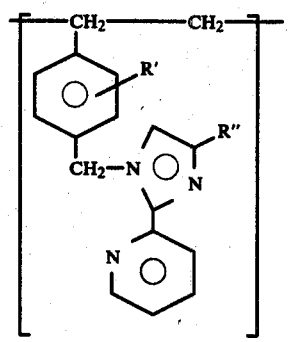

wherein R' is hydrogen or bromine and R" is hydrogen, methyl, chloro, bromo or methoxy.

* * * * *